United States Patent [19]

Fitzgerald

[11] Patent Number: 5,841,642
[45] Date of Patent: Nov. 24, 1998

[54] TUNED SWITCH-MODE POWER SUPPLY WITH CURRENT MODE CONTROL

[75] Inventor: William Vincent Fitzgerald, Zionsville, Ind.

[73] Assignee: Thomson Consumer Electronics, Inc., Indianapolis, Ind.

[21] Appl. No.: 891,843

[22] Filed: Jul. 10, 1997

Related U.S. Application Data

[63] Continuation of Ser. No. 537,965, Oct. 2, 1995, abandoned.

[51] Int. Cl.$^6$ .......................... H02M 3/335; H02M 3/24; H02M 1/16
[52] U.S. Cl. .................................. 363/21; 363/16; 363/95
[58] Field of Search .............................. 363/16, 20, 21, 363/95

[56] References Cited

U.S. PATENT DOCUMENTS

| | | | |
|---|---|---|---|
| 3,873,846 | 3/1975 | Morio et al. | 307/23 |
| 4,037,271 | 7/1977 | Keller | 363/21 |
| 4,208,705 | 6/1980 | Hosoya | 363/19 |
| 4,228,493 | 10/1980 | De Sartre et al. | 363/21 |
| 4,253,137 | 2/1981 | Rao | 363/21 |
| 4,276,586 | 6/1981 | Boekhorst | 363/21 |
| 4,327,404 | 4/1982 | Horiguchi | 363/21 |
| 4,481,564 | 11/1984 | Balaban | 363/21 |
| 4,535,399 | 8/1985 | Szepesi | 363/97 |
| 4,593,347 | 6/1986 | Peruth et al. | 363/21 |
| 4,845,605 | 7/1989 | Steigerwald | 363/21 |
| 4,885,671 | 12/1989 | Peil | 363/17 |
| 4,903,182 | 2/1990 | Pilukaitis et al. | 363/19 |
| 4,930,060 | 5/1990 | Leonardi | 363/21 |
| 5,066,900 | 11/1991 | Bassett | 323/224 |
| 5,171,949 | 12/1992 | Fujishima et al. | 219/10.55 B |
| 5,267,133 | 11/1993 | Motomura et al. | 363/21 |
| 5,442,539 | 8/1995 | Cuk et al. | 363/16 |
| 5,453,921 | 9/1995 | Schutts | 363/21 |
| 5,515,263 | 5/1996 | Otake et al. | 363/21 |
| 5,570,278 | 10/1996 | Cross | 363/20 |
| 5,581,451 | 12/1996 | Ochiai | 363/21 |

FOREIGN PATENT DOCUMENTS

| | | | |
|---|---|---|---|
| 043761 | 1/1981 | European Pat. Off. | H02M 3/335 |
| 0 049 633 A1 | 4/1982 | European Pat. Off. | H02P 13/22 |
| 0 086 521 A1 | 8/1983 | European Pat. Off. | H04N 3/18 |
| 0 091 133 A1 | 10/1983 | European Pat. Off. | H02P 13/22 |
| 2460579 | 1/1982 | France | H04N 3/18 |
| 2 575 617 | 7/1986 | France | H02M 3/335 |

OTHER PUBLICATIONS

Tokimune Kitajima et al., "Reduction of Power Loss In Voltage Resonant Converter", Thirteenth Intl'l Telecommunications Energy Conference, Kyoto, Japan, Nov, 1991, pp. 145–150.

Unitrode Linear Integrated Circuits Data And Applications Handbook, pp. 4–120 to 4–126.

(List continued on next page.)

*Primary Examiner*—Peter S. Wong
*Assistant Examiner*—Bao Q. Vu
*Attorney, Agent, or Firm*—Joseph S. Tripoli; Joseph J. Laks; Sammy S. Henig

[57] ABSTRACT

In a tuned switch mode power supply a zero voltage is maintained across a transistor switch, during both turn off and turn on switching transition intervals in the transistor switch. The tuned switch mode power supply operates in a current-mode control, on a current pulse-by-current pulse control basis. A modulator of the power supply includes a pair of transistors that form a regenerative switch to produce a portion of a control signal of the transistor switch that causes the transistor switch to turn off. A transformer-coupled input supply voltage maintains the transistor switch conductive as long as the current in the transistor switch does not exceed the threshold level of a regenerative switch. A resonant pulse is transformer-coupled from the resonant circuit to the regenerative switch for turning off the regenerative switch and for maintaining the transistor switch non conductive after the regenerative switch is turned off.

15 Claims, 2 Drawing Sheets

OTHER PUBLICATIONS

Current–sensing IC improves regulation of power supplies, Jun. 17, 1985, pp. 77, 80, 81, 82.

Zero–Voltage Switching technique in DC/DC Converters, by Liu, et al., pp. 58 to 70.

Resonant Switches—A Unified Approach to Improve Performances of Switching Converters by K–H Liu, et al., pp. 344–351.

Zero–Voltage–Switching Technique In High–Frequency Off–Line Converters by M. M. Jovanociv, et al., pp. 23–32.

Samsung Electronics, KA3842B/3B/4B/5B Linear Integrated Circuit pp. 822–828.

Power Supply Cookbook, Marty Brown, Motorola, 1994, p. 137.

TUNED SWITCH-MODE POWER SUPPLY WITH CURRENT MODE CONTROL

This is a continuation of application Ser. No. 537,965, filed Oct. 2, 1995 now abandoned.

The invention relates to a switch mode power supply.

A typical tuned switch-mode power supply (SMPS) includes a series arrangement of an inductance and a bi-directional controllable switch connected to input supply voltage terminals for receiving an input supply voltage. The switch is formed by a parallel arrangement of a transistor and a damper diode. A tuning capacitor is coupled to the inductance to form a resonant circuit. A drive or control circuit provides switching pulses for driving the switch alternately into the conducting and the cut-off states, the duration of the conducting state of the switch being controllable in dependence upon the output voltage by rectification of oscillations produced during periods when the switch is cut-off.

In such tuned SMPS, a substantially sinusoidal oscillation of a resonant pulse voltage of a large amplitude is developed in the inductance. The frequency of the oscillation is determined by the resonance frequency of the resonant circuit. After completion of a half cycle of oscillation the diode conducts and terminates the half cycle oscillation. The transistor is turned on when the diode is already conductive. Therefore, a zero voltage is maintained across the transistor, during the transition interval in the transistor. Thus, switching losses are reduced. In addition, the resonant circuit prevents the voltage that is developed across the transistor when the transistor is turned off from becoming excessive.

A modulator in a regulation control circuit of some prior art tuned SMPS's is responsive to an error signal produced in an error amplifier for varying a length of an interval when the bi-directional switch is conductive. The peak of the current in the inductance is thereby controlled. In this way, the amplitude of the resonant pulse voltage that is developed when the bi-directional switch is turned off is controlled for providing output voltage regulation.

Disadvantageously, in some prior art tuned SMPS's, variation of the input supply voltage is compensated in a relatively slow manner. The slow response time of the control circuit of such SMPS is determined mainly by the transient response of the feedback control loop. It may be desirable to speed up the response time of the tuned SMPS.

A tuned SMPS, embodying an inventive feature, operates in a current-mode control, on a current-pulse by current-pulse control basis. The current flowing in a switch terminates when it reaches a threshold level established by an error signal. The error signal actually controls the peak current in an inductance that is coupled to the switch. In this way, the control circuit corrects instantaneously in a feed forward manner for input voltage variations without using the dynamic range of the error amplifier. In this way, both the advantages of current mode regulation and of tuned SMPS are obtained.

A tuned switch mode power supply apparatus, embodying an aspect of the invention, includes a source of an input supply voltage and a tuned, resonant circuit. The resonant circuit includes a capacitance and an inductance coupled to the source of the input supply voltage. A first transistor switch is coupled to the inductance and is responsive to a periodic, switch control signal for generating current pulses in the inductance to produce resonant pulses in the resonant circuit. The resonant pulses are coupled to a load circuit for generating an output of the power supply. When the first transistor switch is being turned on, a substantially zero voltage is maintained between a pair of main current conducting terminals of the first transistor switch. A source of a second signal is used for controlling the output of the power supply in accordance with the second signal. A modulator is responsive to a given current pulse and to the second signal for generating the switch control signal. The power supply output is current mode controlled, in accordance with the second signal, on a current-pulse by current-pulse control basis.

In accordance with an inventive feature, the modulator includes a pair of transistors that form a regenerative switch to produce a portion of the control signal of the transistor switch that causes the transistor switch to turn off. The regenerative switch forms a latch that is triggered by a signal representative of the current pulse in the transistor switch. Advantageously, the transition of the control signal is speeded up by the positive feedback in the latch.

In accordance with another inventive feature, an error signal that is indicative of a difference between the output voltage of the power supply and a reference level is coupled to one of the pair of transistors to establish the triggering threshold level of the latch. In this way, advantageously, the one transistor of the pair also operates as a comparator.

In accordance with a further inventive feature, the inductance forms a first winding of a transformer for transformer-coupling the input supply voltage to a control terminal of the transistor switch when the transistor switch is conductive in a positive feedback manner. The transformer-coupled input supply voltage maintains the transistor switch conductive as long as the current in the transistor switch does not exceed the threshold level of the regenerative switch. The resonant pulse is transformer-coupled to the latch for turning off the regenerative switch. The resonant pulse is also transformer-coupled to the control terminal of the transistor switch in a positive feedback manner, and bypasses the regenerative switch, for maintaining the transistor switch non conductive after the regenerative switch is turned off.

Figure 1:
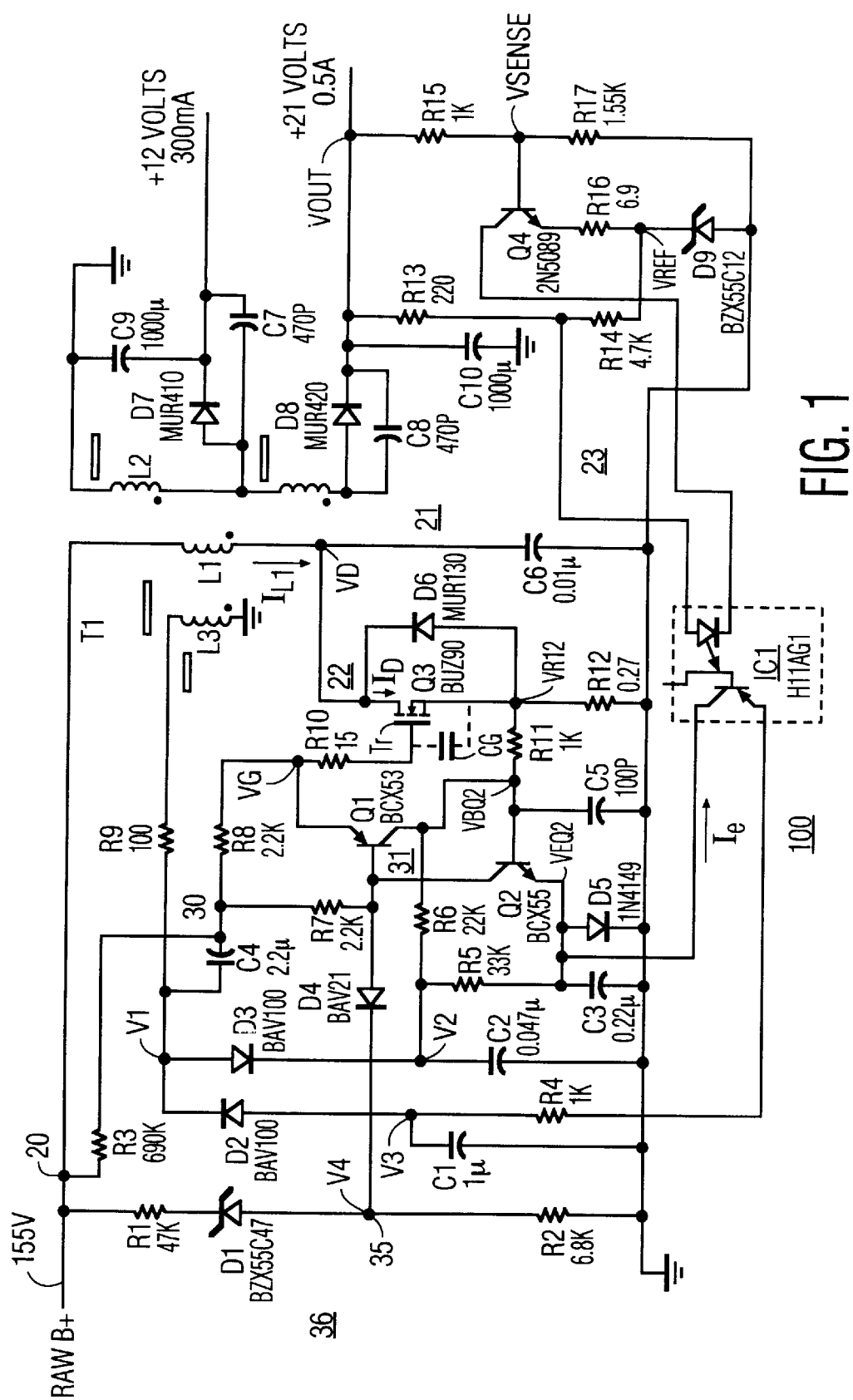
FIG. 1 illustrates a tuned SMPS embodying an aspect of the invention.

FIG. 1 illustrates a tuned SMPS 100, embodying an aspect of the invention. In FIG. 1, an N-type, metal oxide semiconductor (MOS) power transistor Tr operating as a transistor switch has a drain electrode coupled through a primary winding L1 of a transformer T1 to a terminal 20 of an input supply, direct current (DC) voltage B+. In a circuit configuration, not shown, the transformer can serve as an isolation transformer. Voltage B+ is derived from, for example, a filter capacitor coupled to a bridge rectifier that rectifies a mains supply voltage, not shown.

A source electrode of transistor Tr is coupled via a current sensor or sampling resistor R12. A damper diode D6 operating as a switch is coupled in parallel with transistor Tr and is included in the same package with transistor Tr to form a bi-directional switch 22. Capacitor C6 is coupled in parallel with diode D6 and in series with winding L1 to form with an inductance of winding L1 a resonant circuit 21 when switch 22 is non conductive.

A secondary winding L2 of transformer T1 is coupled to an anode of a peak rectifying diode D8 and to ground for generating an output voltage VOUT in a filter capacitor C10 that is coupled to a cathode of diode D8. Voltage VOUT is coupled to a load circuit, not shown. An error amplifier 23 includes a comparator transistor Q4 having a base electrode that is coupled to a voltage divider of voltage VOUT formed by resistors R15 and R17 where a voltage VSENSE is developed. Voltage VSENSE is equal to a corresponding portion of voltage VOUT and, thus, proportional to voltage VOUT.

An emitter electrode of transistor Q4 is coupled via a gain determining resistor R16 to a Zener diode D9 that develops a reference voltage VREF of error amplifier 23. Diode D9 is energized via series coupled resistors R13 and R14 from voltage VOUT. A photo-coupler IC1 includes a light emitting diode that is coupled between the collector of transistor Q4 and a junction terminal between resistors R13 and R14. An emitter electrode of the transistor of photo-coupler IC1 is coupled to a negative DC voltage V3 via a resistor R4. A collector electrode of the transistor of photo-coupler IC1 is coupled to capacitor C3. In a circuit configuration not shown the opto-coupler can serve for isolation. An error collector current Ie of the opto-coupler IC1 is indicative of an amount by which voltage VSENSE is greater than reference voltage VREF and, thus, of the difference there between.

A comparator transistor Q2 has a base electrode that is coupled via a resistor R11 to a junction terminal between the source electrode of transistor Tr and current sensor resistor R12. Transistor Q2 compares a base voltage VBQ2 of transistor Q2 to an error voltage VBQ2 developed at the emitter of transistor Q2. Voltage VBQ2 includes a first portion that is proportional to a source-drain current ID in transistor Tr. A DC voltage V2 is coupled via a resistor R6 to the base of transistor Q2 to develop a second portion of voltage VBQ2 across resistor R11.

DC voltage V2 is also coupled via a resistor R5 to a feedback loop filter formed by capacitor C3 to form a current source that charges capacitor C2. Error signal or current Ie is coupled to capacitor C3 for discharging capacitor C3. A diode D5 is coupled between the emitter of transistor Q2 and ground. Diode D5 limits voltage VEQ2 to diode D5 forward voltage and limits the maximum current in transistor Tr.

The collector electrode of transistor Q2 is coupled to the base electrode of a transistor Q1 and the collector electrode of transistor Q1 is coupled to the base electrode of a transistor Q2 to form a regenerative switch 31. A control signal or voltage VG of transistor Tr is developed at the emitter of transistor Q1 that forms an output terminal of regenerative switch 31 and is coupled to the gate electrode of transistor Tr via a resistor R10.

A secondary winding L3 of transformer T1 is coupled via a resistor R9 for producing an alternating current (AC) voltage V1. Voltage V1 is AC-coupled via a capacitor C4 and a resistor R8 to the emitter of transistor Q1 to generate drive voltage VG of transistor Tr. AC-coupled voltage V1 is coupled via a collector resistor R7 to the collector electrode of transistor Q2 and to the base electrode of transistor Q1. Voltage V1 is also rectified by a diode D2 to generate voltage V3 and by a diode D3 to generate voltage V2.

A resistor R3 coupled between the source of voltage B+ and a terminal 30 of capacitor C4 that is remote from winding L3 charges capacitor C4 upon power on or start up. When voltage VG on the gate electrode of transistor Tr exceeds a threshold voltage of MOS transistor Tr, Transistor Tr conducts causing a drain voltage VD of transistor Tr to decrease. As a result, voltage V1 becomes positive and reinforce voltage VG for maintaining transistor Tr, in a positive feedback manner, fully turned on.

Figure 2A:
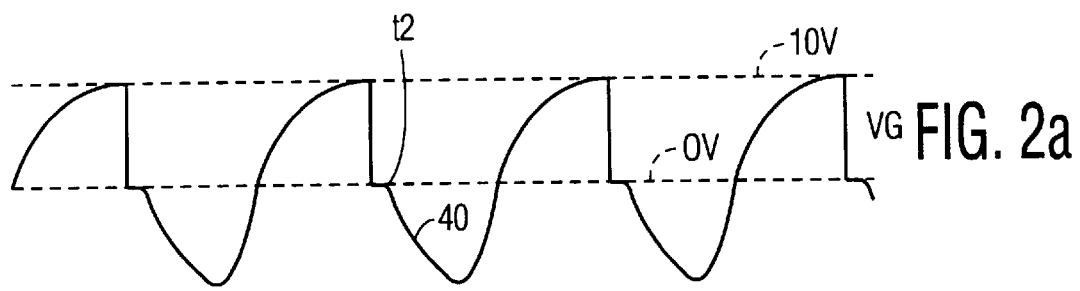
FIGS. 2a, 2b and 2c illustrate wave forms useful for the explanation of the tuned SMPS of FIG. 1.
Figure 2B:
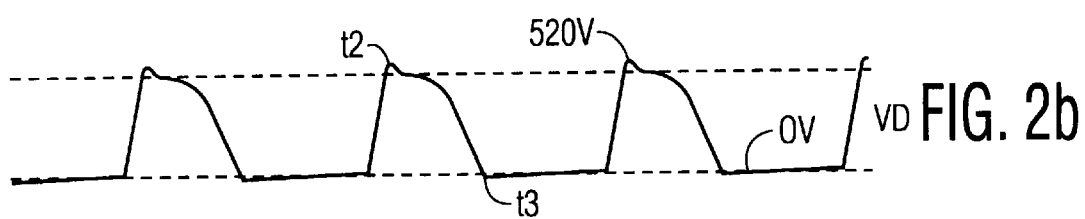
Figure 2C:
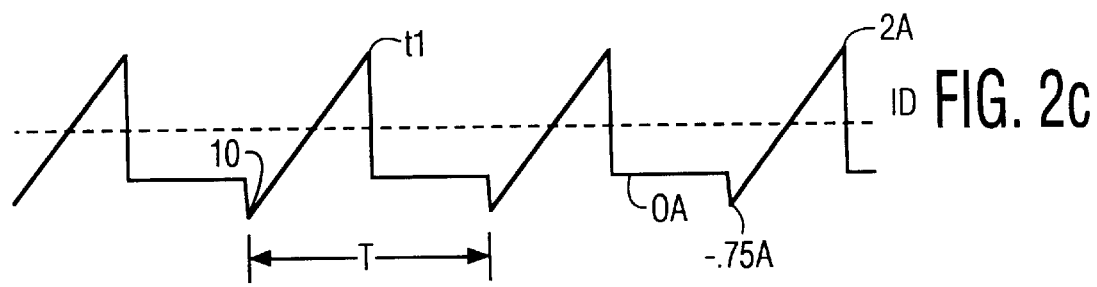

FIGS. 2a–2c illustrate wave forms useful for explaining the operation of tuned SMPS 100 of FIG. 1. Similar symbols and numerals in FIGS. 1 and 2a–2c indicate similar items or functions.

During an interval t0–t1 of a given period T of FIG. 2c, current ID of conductive transistor Tr of FIG. 1 is up-ramping. Consequently, a corresponding non-resonant current pulse portion of a current IL1 in winding L1 is up-ramping and stores magnetic energy in the inductance associated with winding L1 of transformer T1. At time t1 of FIG. 2c, voltage VBQ2 of FIG. 1, containing an up-ramping portion derived from the voltage across resistor R12, exceeds a triggering level of regenerative switch 31 that is determined by voltage VEQ2 and turns on transistor Q2. Current flows in the base of transistor Q1 and regenerative switch 31 applies a low impedance at the gate electrode of transistor Tr. Consequently, gate electrode voltage VG of FIG. 2a is reduced to near zero volts and turns off transistor Tr of FIG. 1. When transistor Tr is turned off, drain voltage VD of FIG. 2b increases and causes voltage V1 of FIG. 1 that is coupled from winding L3 to decrease. The charge stored in gate-source capacitance CG maintains latch mode operation until time t2 of FIG. 2a.

In accordance with an inventive feature, when voltage VG becomes smaller than required to maintain sufficient collector current in transistor Q1 of FIG. 1, a forward conduction on the base electrode of transistor Q2 ceases and, consequently, latch operation mode in regenerative switch 31 is disabled. Afterwards, voltage V1 that continues to decrease causes a negative portion 40 of voltage VG of FIG. 2a to maintain transistor Tr of FIG. 1 turned off.

When transistor Tr is turned off, drain voltage VD increases as shown during interval t1–t2 of FIG. 2b. Capacitor C6 of FIG. 1 limits the rate of increase of voltage VD such that transistor Tr is completely nonconductive before voltage VD increases appreciably above zero voltage. Thereby, switching losses and radiated switching noise are, advantageously, reduced.

Resonant circuit 21 that includes capacitor C6 and winding L1 oscillates, during interval t1–t3 of FIG. 2b, when transistor Tr of FIG. 1 is turned off. Capacitor C6 limits the peak level of voltage VD. Therefore, advantageously, no snubber diode and resistor are needed so that efficiency is improved and switching noise is reduced.

The decrease in voltage VD prior to time t3 of FIG. 2b, causes voltage V1 of FIG. 1 to become a positive voltage. At time t3 of FIG. 2b, voltage VD is close to zero volts and slightly negative, causing damper diode D6 of FIG. 1 to turn on and to clamp voltage VD of FIG. 2b to approximately zero volts. Thus, resonant circuit 21 of FIG. 1 exhibits a half cycle of oscillation. After time t3 of FIG. 2b, voltage VG of FIG. 2a becomes increasingly more positive, because of the aforementioned change in polarity of voltage V1 of FIG. 1.

Advantageouly, the following turn on of transistor Tr is delayed by a delay time that is determined by the time constant of resistor R8 and gate capacitance CG until after time t3 of FIG. 2b when voltage VD is nearly zero volts. Therefore, minimal turn-on losses are incurred and switching noise is reduced.

Negative feedback regulation of voltage VOUT is achieved by varying voltage VEQ2 in filter capacitor C3. When Voltage VSENSE that is proportional to voltage VOUT is larger than voltage VREF, current Ie discharges capacitor C3 and decreases voltage VEQ2. Therefore, the threshold level of comparator transistor Q2 is decreased. Consequently, the peak value of current ID in transistor Tr and the power delivered to the load circuit, not shown, are reduced. On the other hand, when voltage VSENSE is smaller than voltage VREF, current Ie is zero and the current in resistor R5 increases voltage VEQ2. Consequently, the peak value of current ID in transistor Tr and the power delivered to the load circuit, not shown, are increased. Thus, the control circuit of transistor Q3 that includes regenerative switch 31 operates as a duty cycle modulator for providing duty cycle modulation of current ID in transistor Q3, in accordance with voltage VEQ2.

In accordance with another inventive feature, tuned SMPS 100 operates in a current mode control, on a current-pulse by current-pulse control basis. The current pulse of current ID during interval t0–t1 of FIG. 2c, flowing in transistor Tr of FIG. 1, terminates at time t1 of FIG. 2c when it reaches the threshold level of transistor Q2 of FIG. 1 that is determined by voltage VEQ2 and is established by error current Ie forming an error signal. The error signal actually controls the peak current of the current pulse of current ID that flows in the inductance of winding L1. Advantageously, the control circuit corrects instantaneously in a feed forward manner for input voltage variations of voltage B+ without using the dynamic range of error amplifier 23. In this way, both the advantages of current mode regulation and of tuned SMPS are obtained.

As indicated before, DC voltage V2 is coupled via resistor R6 to the base of transistor Q2 to develop the second portion of voltage VBQ2 across resistor R11. During interval t0–t1 of FIG. 2c, voltage V2 of FIG. 1 is equal to voltage B+ multiplied by the turn ratio of windings L3 and L1 of transformer T1.

In accordance with a further inventive feature, the threshold level of transistor Q2 varies in accordance with voltage V2 and, therefore, in accordance with voltage B+. Thus, the peak value of current ID also varies in accordance with voltage B+. Advantageously, this feature tends to maintain a constant power delivery capability of SMPS 100 so that excessive power cannot be delivered at high AC mains supply voltage, not shown.

In accordance with an additional inventive feature, start-up at abnormally low input voltage B+ is inhibited by a diode D4 having an anode that is coupled to the base of transistor Q1 and a cathode that is coupled to a junction terminal 35 of a voltage divider 36. Voltage divider 36 is coupled between voltage B+ and ground and include the series arrangement of a resistor R1, a Zener diode D1 and a resistor R2 such that terminal 35 is coupled between Zener diode D1 and resistor R2. At low input voltage B+, Zener diode D1 is turned off and a voltage V4 at terminal 35 causes diode D4 to conduct in a manner to turn on transistor Q1 and disable transistor Tr. On the other hand, at normal levels of voltage B+, diode D1 is conductive and diode D4 is back biased and has no effect on circuit operation.

What is claimed is:

1. A tuned switch mode power supply apparatus, comprising:
    a source of an input supply voltage;
    a tuned, resonant circuit including a capacitance and an inductance coupled to said source of said input supply voltage;
    a first transistor switch coupled to said inductance and responsive to a periodic, switch control signal for generating current pulses in said inductance and resonant pulses in said resonant circuit, said inductance current pulses being coupled to a load circuit for generating an output of said power supply, said resonant pulses being coupled in a feedback manner to a control terminal of said first transistor switch, when said first transistor switch is turned off, for controlling when said first transistor switch becomes turned on, such that, when current starts flowing in said first transistor switch, a substantially zero voltage is maintained between a pair of main current conducting terminals of said first transistor switch to provide for zero voltage switching;
    a source of a second signal for controlling said output of said power supply in accordance with said second signal; and
    a modulator responsive to a given current pulse and to said second signal for generating said switch control signal such that said power supply output is current mode controlled, in accordance with said second signal on a current-pulse by current-pulse control basis.

2. An apparatus according to claim 1 wherein in a given switching period of said first transistor switch, said resonant pulse forms one half cycle of oscillation in said resonant circuit.

3. An apparatus according to claim 1 further comprising, a second switch coupled to said first transistor switch for applying a low impedance between said main current conducting terminals to maintain the substantially zero voltage between said main current conducting terminals of said first transistor switch when said first transistor switch is being turned on.

4. An apparatus according to claim 3 wherein said second switch comprises a damper diode that is coupled in parallel with said first transistor switch.

5. An apparatus according to claim 1 further comprising, a resistor coupled in series with said first transistor switch for developing therein a ramping voltage that is indicative of a ramping portion of said current pulse such that said switch control signal causes the state of said first transistor switch to change, during said ramping portion of said given current pulse, when said given current pulse exceeds a level that is determined by said second signal.

6. An apparatus according to claim 1 wherein a change in said second signal affects a length of an interval between adjacent resonant pulses and does not affect a pulse width of said resonant pulse.

7. An apparatus according to claim 1 wherein said modulator comprises a comparator, a second transistor having a control terminal responsive to said current pulse, a first main current conducting terminal responsive to an output of said comparator and a second main current conducting terminal coupled to a third transistor in a positive feedback manner to form therewith a regenerative switch that is coupled to said control terminal of said first transistor switch.

8. An apparatus according to claim 7 wherein said current pulse varies in a ramping manner and produces a switching transition in said regenerative switch when said current pulse exceeds a threshold level that is determined by said second signal to operate said regenerative switch in a latch mode of operation, and wherein said resonant pulse is coupled to said regenerative switch for producing an opposite change of state in said regenerative switch.

9. An apparatus according to claim 8 wherein said resonant pulse is coupled to said regenerative switch to disable the latch operation.

10. An apparatus according to claim 1 wherein said source of said second signal comprises a comparator responsive to said output of said power supply and to a signal at a reference level for generating an error signal that is coupled to said modulator via a feedback loop filter to develop said second signal at an output of said filter.

11. An apparatus according to claim 1 wherein a capacitance that is coupled to one of said main current conducting terminals of said first transistor switch substantially reduces a rate of change of said voltage between said pair of main current conducting terminals when said first transistor switch is being turned off.

12. An apparatus according to claim 1 further comprising, a regenerative switch responsive to said current pulse and coupled to a control terminal of said first transistor switch wherein when said current pulse exceeds a threshold level of said regenerative switch, said regenerative switch, operating as a latch, is triggered, and wherein said resonant pulse is coupled to said regenerative switch for disabling the latch operation in said regenerative switch and is also coupled to said control terminal of said first transistor switch in a manner that bypasses said regenerative switch for maintaining said first transistor switch a nonconductive following a time when the latch operation is disabled.

13. An apparatus according to claim 12 wherein said resonant pulse maintains said first transistor switch nonconductive as long as a magnitude of said resonant pulse is within a range of values, and produces a switching transition when said magnitude of said resonant pulse is outside said range of values.

14. An apparatus according to claim 1 further comprising, a first winding of a transformer having a second winding that is coupled to one of said main current conducting terminals of said first transistor switch and to said source of input supply voltage for transformer-coupling said input supply voltage to said control terminal of said first transistor switch via said first winding in a positive feedback manner to produce said control signal at a first state, during a first portion of a period, wherein said resonant pulse is coupled to said control terminal of said first transistor switch via said first winding in a positive feedback manner for producing said control signal at a second state, during a second portion of said period.

15. An apparatus according to claim 14 further comprising, a regenerative switch responsive to said current pulse and coupled to said control terminal of said first transistor switch wherein, during said first portion of said period, when said current pulse exceeds a threshold level of said regenerative switch, said regenerative switch operates as a latch that is triggered in a first direction and wherein said resonant pulse is coupled to said regenerative switch for disabling the latch operation and is also coupled to said control terminal for maintaining said switch nonconductive following a time when the latch operation is disabled.

* * * * *